(12) United States Patent
Arndt et al.

(10) Patent No.: US 7,164,973 B2
(45) Date of Patent: Jan. 16, 2007

(54) METHOD FOR DETERMINING VEHICLE VELOCITY

(75) Inventors: Dietmar Arndt, Kleinsachsenheim (DE); Dirk Foerstner, Stuttgart (DE); Markus Lutz, Palo Alto, CA (US); Jasim Ahmed, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 10/480,747

(22) PCT Filed: Jun. 12, 2002

(86) PCT No.: PCT/DE02/02147

§ 371 (c)(1),
(2), (4) Date: May 27, 2004

(87) PCT Pub. No.: WO02/103366

PCT Pub. Date: Dec. 27, 2002

(65) Prior Publication Data

US 2004/0210354 A1   Oct. 21, 2004

(30) Foreign Application Priority Data

Oct. 2, 2001   (DE) ................. 101 48 667

(51) Int. Cl.
*B60T 8/32* (2006.01)
*G06D 7/00* (2006.01)

(52) U.S. Cl. ............... 701/1; 701/93; 180/170

(58) Field of Classification Search ............ 701/70, 701/93, 119, 79, 1; 702/154; 180/170
See application file for complete search history.

(56) References Cited

U.S. PATENT DOCUMENTS

| 5,856,802 A | 1/1999 | Ikeda et al. |
| 5,862,511 A | 1/1999 | Croyle et al. |
| 5,923,286 A * | 7/1999 | Divakaruni ............ 342/357.06 |
| 6,480,806 B1 * | 11/2002 | Bilz et al. .................. 702/154 |
| 2001/0056321 A1 | 12/2001 | Decker et al. |

FOREIGN PATENT DOCUMENTS

| DE | 196 452 09 | 5/1998 |
| DE | 197 481 27 | 5/1999 |
| DE | 198 295 82 | 3/2000 |
| DE | 199 441 77 | 4/2001 |
| DE | 100 085 50 | 9/2001 |
| DE | 100 499 05 | 10/2001 |
| EP | 0 838 660 | 4/1998 |
| JP | 8-268257 | 10/1996 |
| JP | 9-287962 | 11/1997 |
| JP | 10-507274 | 7/1998 |
| JP | 2000-294015 | 10/2000 |

\* cited by examiner

*Primary Examiner*—Y. Beaulieu
(74) *Attorney, Agent, or Firm*—Kenyon & Kenyon LLP

(57) ABSTRACT

A method and device for determining a vectorial vehicle velocity by estimating a mean value for the vehicle velocity by using a position-finding device to obtain a first value, and to then compare this first value with a second value estimated using inertial sensors.

10 Claims, 2 Drawing Sheets

METHOD FOR DETERMINING VEHICLE VELOCITY

FIELD OF THE INVENTION

The present invention is directed to a method and device for determining a vectorial vehicle velocity.

BACKGROUND INFORMATION

It is already discussed in the German patent application DE 10049905 (not a prior publication) to employ a kinematic sensor platform in a control unit, where the kinematic sensor platform includes inertial sensors such as acceleration sensors and rotational speed sensors. That makes it possible to determine a value for the vectorial vehicle velocity. This value can be supplied to a vehicle dynamics control system (ESP=electronic stability program), so that an ESP regulates the vehicle dynamics according to the sensor values. This related art therefore leads to the object of improving the determination of the vectorial vehicle velocity.

SUMMARY OF THE INVENTION

An exemplary method of the present invention for determining a vectorial vehicle velocity, has the advantage over the related art that the inertial sensors are augmented by the addition of a position-finding device which is used to determine a second value for the vectorial vehicle velocity, in order to produce, by comparing the value that was determined using the inertial sensors and the value that was determined using the position-finding device, an average value that represents a better estimate of the vectorial vehicle velocity. That also makes it possible to dispense with selective under-braking to determine the vehicle velocity, so that such interventions by a regulator are no longer necessary. This results then on the whole in a shortening of the stopping distance. An additional advantage is that the improved vectorial vehicle velocity enables the control of vehicle dynamics by ESP to be improved.

In an exemplary embodiment the position-finding device is a GPS (global positioning system) which makes possible a very precise determination of position and thus also a very precise determination of velocity. The velocity may be determined from the Doppler effect of the carrier signals or from the carrier phases. A velocity vector is therefore available, because both the magnitude and the direction are thereby determinable as components of the velocity vector. This may be improved by using two or three antennas, so that the orientation is determinable in two dimensions or in three dimensions.

Furthermore, a vehicle dynamics control system such as ESP is improved thereby, since a maximum number of bits of sensor information are made available to the ESP system. The weighting of the velocity values that have been determined using the position-finding device and the inertial sensors depends on the number of satellites the position-finding device, as a satellite-based system, is able to receive at the time of measurement, the number of antennas used, and in the case of the velocity determined by the inertial sensors, the number of tires that are slipping. Establishing a mean value then makes it possible to estimate the vectorial vehicle velocity as precisely as possible.

In another exemplary embodiment of the present invention, a device for carrying out or performing the method according to the present invention is available, which has a sensor platform including a position-finding device, with either two or three antennas being employed when a GPS system is used.

DETAILED DESCRIPTION

For some time the suppliers of vehicle manufacturers have been working intensely on vehicle systems that are intended to stabilize the vehicle states in situations of borderline vehicle dynamics. ABS (anti-lock brake system), TCS (traction control system or ASR (anti-slip regulation)) and ESP are employed. The sensor technology on which such systems rely includes primarily yaw rate sensors, transverse acceleration sensors, and sensors of wheel rotation speed, brake pressure and steering angle. These sensors make it possible to determine the driver's intention in regard to direction and acceleration/braking, and on this basis the motion state of the vehicle is determined. Essential variables for correctly regulating the state of the vehicle are the vehicle velocity, the yaw rate and the float angle of the vehicle.

Control units are now able to have an intelligent sensor platform, where such a sensor platform represents an integration of inertial sensors, i.e., linear acceleration sensors and yaw rate sensors. Now the objective is to estimate the driving condition with the support of a model.

According to an exemplary embodiment of the present invention, an intelligent sensor platform of this sort is now augmented by the addition of a position-finding device that is designed to enable an improved estimation of the vectorial vehicle velocity. This improves the effect of a vehicle dynamics control system such as ESP.

Figure 2:
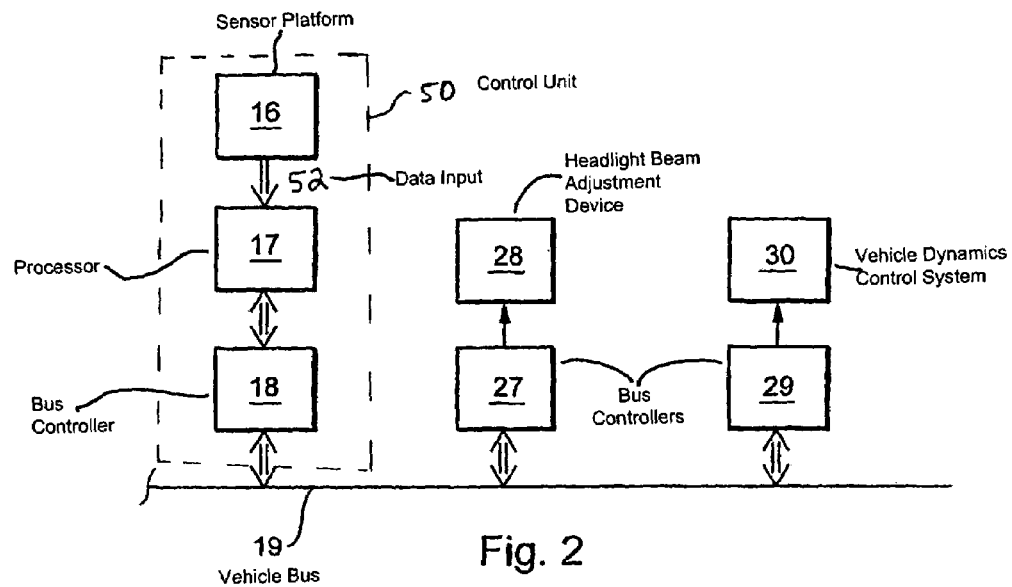
FIG. 2 shows a schematic diagram of a vehicle bus system.

FIG. 2 shows a schematic block diagram illustrating how various systems are connected with each other in a vehicle via a bus. A vehicle bus 19, for example a CAN bus, here connects a control unit 50 that is made up in part of a bus controller 18, a processor 17 and a sensor platform 16 to a headlight beam adjustment device 28 and a vehicle dynamics control system 30, which may be an ESP system. Both headlight beam adjustment device 28 and vehicle dynamics control system 30 have bus controllers 27 and 29 respectively, to enable communication via bus 19. Sensor platform 16 is connected, via a data input 52, to processor 17, which processes the sensor data and then conveys appropriate data such as an estimate of vehicle velocity via bus controller 18 to headlight beam adjustment device 28 and vehicle dynamics control system 30.

Figure 3:
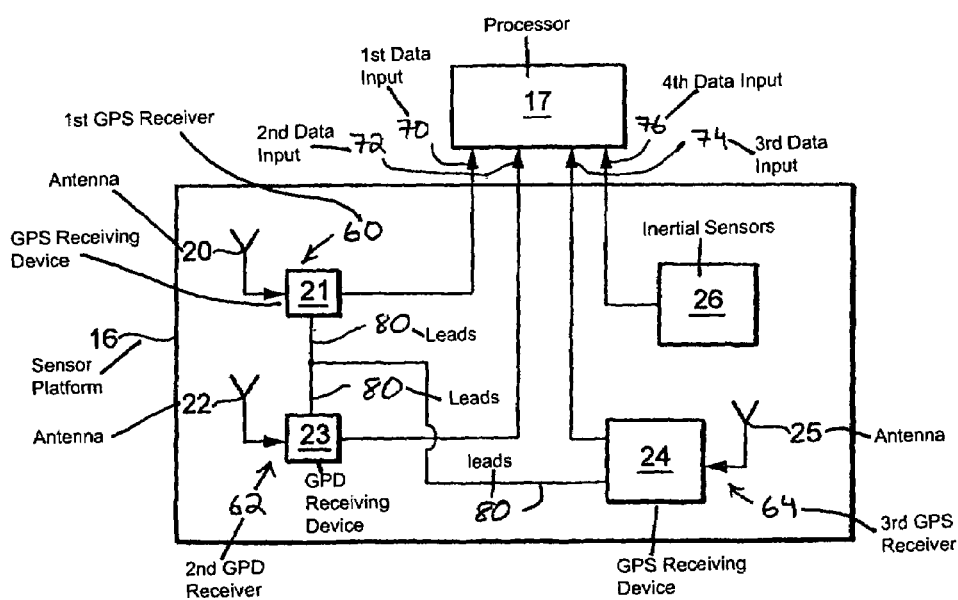
FIG. 3 shows a schematic diagram of a kinematic sensor platform having a position-finding device.

FIG. 3 shows the layout of sensor platform 16, which is connected to processor 17. There are three GPS receivers on sensor platform 16. The first GPS receiver 60 has an antenna 20 and a GPS receiving device 21 which is connected to a first data input of processor 17. A second GPS receiver 62 made up of an antenna 22 and a GPS receiving device 23 downline, is connected to a second data input 72 of processor 17. A third GPS receiver 64 made up of an antenna 25 and a GPS receiving device 24, is connected to a third data input 74 of processor 17. A group of inertial sensors 26 followed by measurement amplification and digitization are connected to a fourth data input 76 of processor 17. GPS receiving devices 21, 23 and 24 are connected to each other by leads 80, in order to synchronize them with each other.

In an alternative embodiment, only two GPS receivers may be used instead of three. This makes it possible to determine the orientation in two dimensions, whereas three antennas enable determination of the orientation in three dimensions. Also, antennas 20, 22 and 25 may be connected to a receiving device that is able to interpret the different signals together. In that case the signals from antennas 20, 22 and 25 are queried one after the other by the single receiving device. Processor 17 then determines a different value for the vectorial velocity in each case from the GPS data and the sensor data. By comparing these two values an average or mean value is then determined, in order to determine the best possible estimate of the vectorial vehicle velocity. This value is then transmitted to vehicle dynamics control system 30. From the vectorial vehicle velocity the float angle may be determined, which is used for headlight leveling device 28.

Figure 1:
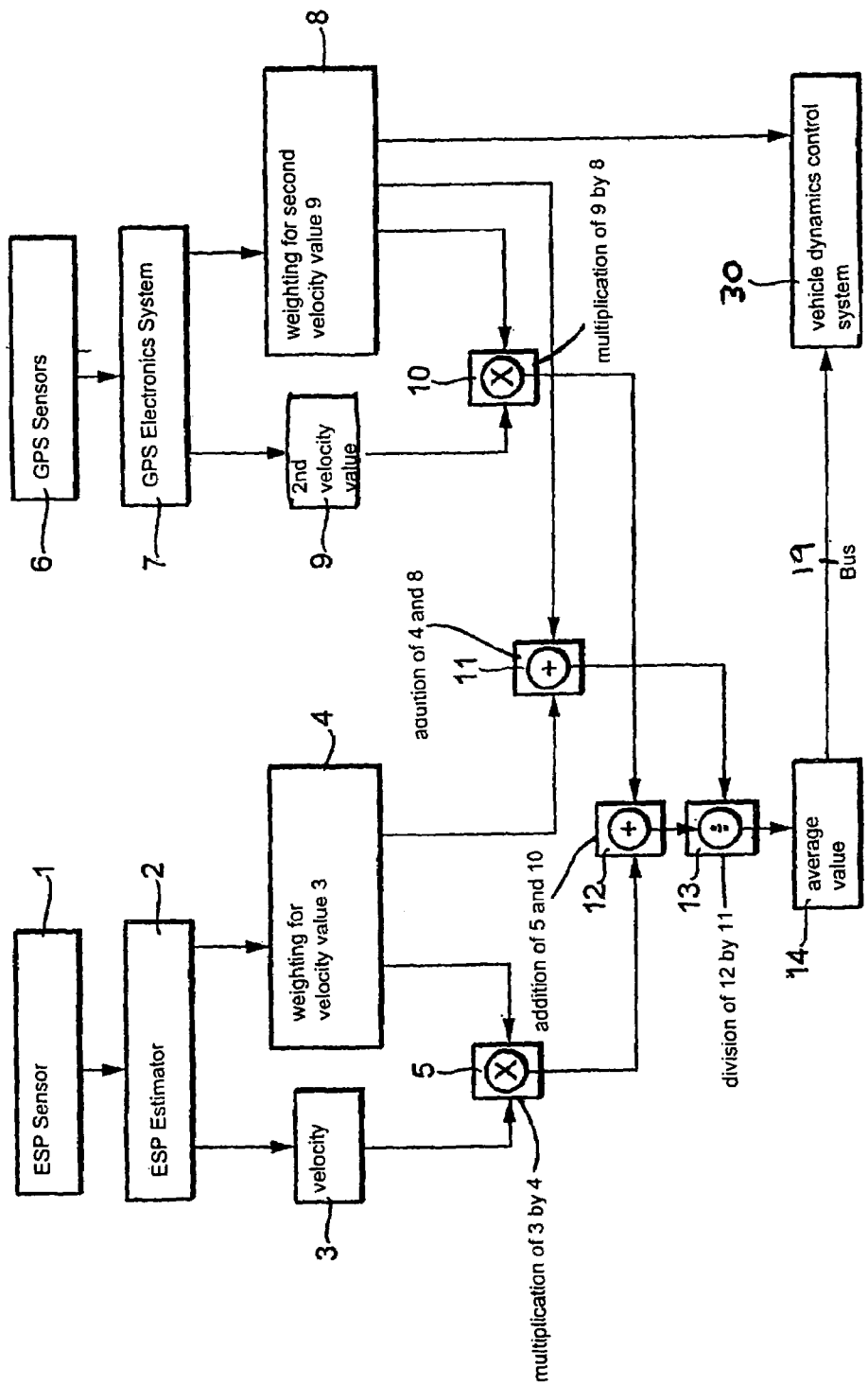
FIG. 1 shows a schematic diagram of the method according to the present invention.

The schematic diagram shown in FIG. 1 describes the method according to the present invention. In block 1, ESP sensors (inertial sensors 26) sense linear acceleration and yaw rate values that occur in the vehicle. An ESP estimator 2 uses these values to determine a first value for velocity 3 and a corresponding weighting 4 for this velocity value. Velocity 3 is determined from the accelerations that occur, i.e., primarily by integration of the determined acceleration values. Weighting 4 is determined from properties of the vehicle such as the slip values of the tires. Velocity value 3 is then multiplied in block 5 by weighting 4. In block 6 GPS sensors (GPA receivers 60, 62. 64) determine the exact position of the vehicle for each point in time, as shown in FIG. 3. Thus, over time the vectorial velocity may be determined. A downstream GPS electronics system 7, which is integrated into processor 17 in FIG. 3, uses this value to determine a second velocity value 9 and a weighting 8 for this second velocity value. In a multiplier 10, velocity value 9 is thus multiplied by weighting 8. In block 11 weighting values 4 and 8 are added together. In block 12 the weighted velocity values are added, and this added value is then divided in block 13 by the sum of the weightings from block 11, in order to determine an average value in block 14. This average value is then transmitted via bus 19 to a vehicle dynamics control system 30, in this case the ESP. As an additional value, weighting 8 is transmitted to vehicle dynamics control system 30. The weightings provide information about the quality of the measured values. If the GPS supplies very reliable information about a vehicle velocity, for example, the corresponding weighting is very high.

A weighted mean value is thus available for the velocity estimate in regard to magnitude and direction, i.e., vectorially.

Now if velocity value 9 is present with suitably good quality, as determined by vehicle dynamics control system 30, it is not necessary to actively under-brake one wheel by the vehicle dynamics control system 30, here an ESP regulator, in order to determine the vehicle velocity.

A significant difficulty is that the vehicle velocity is calculated using GPS in an environmentally fixed coordinate system. In the ESP system, in contrast, the velocity values are present in a vehicle-fixed coordinate system. The vehicle velocities are identified below in the lateral, transverse, and vertical directions with VX, VY, and VZ.

A transformation may be made between the two systems, i.e., between the environmentally fixed and the vehicle-fixed coordinate systems, if the orientation of the vehicle in the environmentally fixed system is known. If two GPS antennas are positioned along the longitudinal axis of the vehicle, the position of the corresponding connecting line $\vec{\alpha}$ in the plane may be determined. The vector $\vec{\alpha}$ is determined in environmentally fixed coordinates. This line is rigidly connected to the vehicle and is therefore used as reference line for the coordinate transformation. This is done by creating the projection of the 3-D velocity vector $\vec{V}$, onto connecting vector $\vec{\alpha}$ whereby the velocity $V_x$ along the longitudinal axis of the vehicle is obtained:

$$V_x = \vec{V} \cdot \vec{\alpha}/|\alpha|.$$

The velocity $$V_{transv} = \vec{V} - V_x \cdot \vec{\alpha}/|\alpha|$$

in any case is perpendicular to the longitudinal axis of the vehicle. When working with two GPS antennas, the information about the position of the vehicle about the vehicle longitudinal axis, i.e., the roll angle, is lacking. This missing information may be supplied when there are three GPS antennas present. In this case the velocity in $V_y$ and $V_z$ may be determined. With only two antennas along the vehicle longitudinal axis, an assumption must be made in order to be able to calculate $V_y$. This assumption is that the roadway does not slope to an edge, i.e., that it has no slope. Consequently $V_y$ is obtained from $V_{transv}$ by setting the z component equal to zero.

Float angle α is a very important variable for the vehicle dynamics, but unfortunately it may only be measurable with great difficulty. It is defined by the equation $\tan(\alpha)=V_y/V_x$. Since both velocities in this equation are now known, the float angle may be determined. In accordance with the figures which describes the method for calculating the vehicle velocity, in addition to the velocity, the float angle calculated by the sensor platform is determined using both the ESP sensor system and the GPS sensor system.

What is claimed is:

1. A method for determining a vectorial vehicle velocity, the method comprising:
   determining a first value of the vectorial vehicle velocity using at least one inertial sensor;
   determining a second value of the vectorial vehicle velocity using at least one position-finding device; and
   determining a third value of the vectorial vehicle velocity based on a comparison of the first and second values of the vectorial vehicle velocity.

2. The method of claim 1, wherein the at least one position-finding device uses a satellite-based positioning system to determine the second value.

3. The method of claim 2, wherein the satellite-based positioning system includes a GPS System.

4. The method of claim 1, further comprising:
   supplying the third value to a vehicle dynamics control system, the vehicle dynamics control system being capable of under-braking one wheel of a vehicle.

5. The method of claim 1, further comprising:
   supplying the third value to a headlight leveling device.

6. The method of claim 1, wherein the third value is determined by weighting the first and second values and determining their average, the average being the third value.

7. A device for determining a vectorial vehicle velocity, comprising:
   at least one inertial sensor;

at least one position-finding device; and a processor operable to perform the following:
  receiving a first value from the at least one inertial sensor,
  receiving a second value from the at least one position-finding device, and
  computing a third value based on a comparison of the first and second values;
wherein the device is connectable to at least one of a vehicle dynamics control system and a headlight leveling device, the vehicle dynamics control system being capable of under-braking one wheel of a vehicle.

8. The device of claim 7, wherein the at least one inertial sensor and the at least one position-finding device are located on a common sensor platform.

9. The device of claim 7, wherein the at least one position-finding device includes two antennas to receive signals that are relevant for a position-finding.

10. The device of claim 7, wherein the at least one position-finding device includes three antennas to receive signals that are relevant for a position-finding.

* * * * *